Dec. 17, 1940.   F. L. CURRIE ET AL   2,224,902

ELECTRICAL TERMINAL AND SWITCHBOARD TERMINAL BLOCK

Filed June 18, 1937   3 Sheets-Sheet 1

INVENTORS
F. L. CURRIE
L. H. ROVERE
BY
Eugene C. Brown
ATTORNEY

Dec. 17, 1940.  F. L. CURRIE ET AL  2,224,902
ELECTRICAL TERMINAL AND SWITCHBOARD TERMINAL BLOCK
Filed June 18, 1937   3 Sheets-Sheet 2
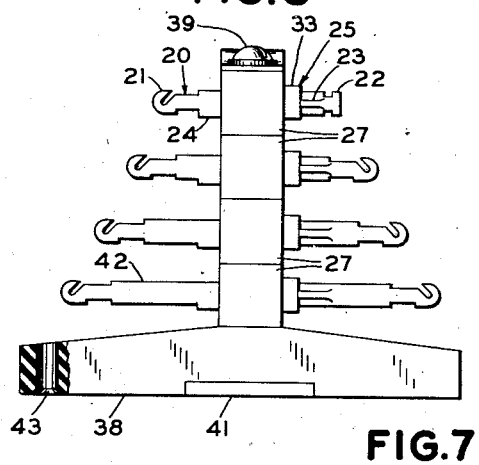
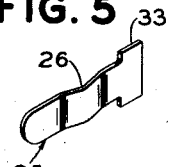
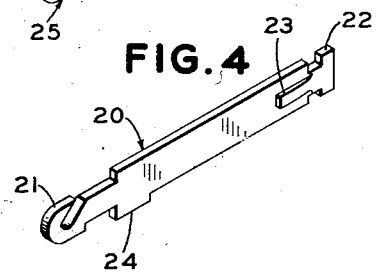
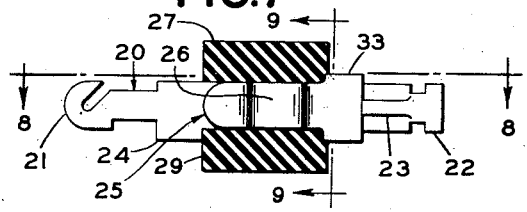
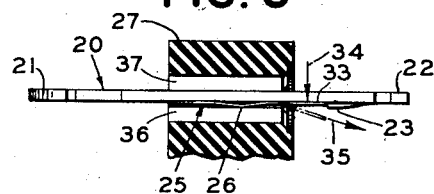
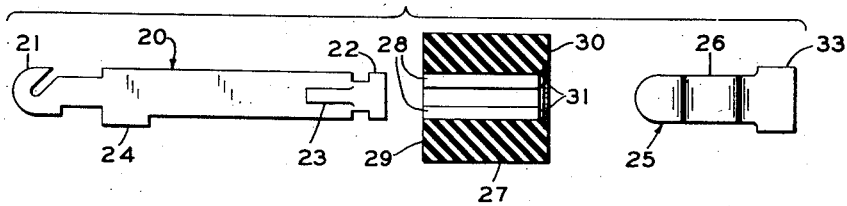
INVENTORS
F. L. CURRIE
L. H. ROVERE
BY Eugene C. Brown
ATTORNEY Dec. 17, 1940.   F. L. CURRIE ET AL   2,224,902
ELECTRICAL TERMINAL AND SWITCHBOARD TERMINAL BLOCK
Filed June 18, 1937   3 Sheets-Sheet 3

INVENTORS
F. L. CURRIE
L. H. ROVERE.
BY Eugene C. Brown
ATTORNEY

Patented Dec. 17, 1940

2,224,902

UNITED STATES PATENT OFFICE 2,224,902

**ELECTRICAL TERMINAL AND SWITCH-
BOARD TERMINAL BLOCK**

Frank Leslie Currie, Plainfield, N. J., and Lewis H. Rovere, Brooklyn, N. Y., assignors to The Western Union Telegraph Company, New York, N. Y., a corporation of New York Application June 18, 1937, Serial No. 149,022

10 Claims. (Cl. 173—324)

This invention relates to a terminal block of the type employed for distribution purposes and has particular reference to the terminals used in such a block.

In telegraph offices and the like, the incoming and outgoing line wires, or cable conductors, and the receiving and transmitting apparatus are interconnected through a switchboard in what are known as regular assignments. Any temporary changes in these assignments may be effected by making appropriate patches between jacks in the switchboard by means of cords provided for such purposes. Associated with the switchboard is a distributing frame on which are mounted terminal blocks embodying facilities for terminating the lines, apparatus, etc., and also facilities for making the cross connections necessary to establish the original regular assignments or to make subsequent changes therein.

Heretofore terminal blocks of the general construction described in Letters Patent No. 1,961,111 granted May 29, 1934, to L. H. Rovere et al., or in Letters Patent No. 2,071,713 granted Feb. 23, 1937, to J. B. Terrill, Jr., have been used on distributing frames as hereinbefore described. Both of the aforementioned terminal blocks employ a flat insulating support having slots formed in one of the flat surfaces thereof and contain in said slots terminal strips having suitable offset portions so as to be secured longitudinally in the slots. The open sides of the slots are closed by backing the supporting member with an insulating spacing member which is, in some cases, wider than the support, and which serves also to space one row of terminals from another.

This type of construction results in having all of the terminals of one row in contact with a ledge, or shelf, which extends the entire length of the block. An accumulation of dust, dirt or other foreign matter on such a ledge may reduce, under certain conditions, the insulation resistance between the terminals of a row, or in some cases, even between the terminals of adjacent rows.

An obvious way of remedying such a condition is to mold the terminal strips into the block, or into sections from which the block may be built up, in such a manner that the terminals are remote from any face which may come in contact with an object to form a crevice. Aside from the undesirable increased cost of such a method of fabrication, the block resulting therefrom would not possess the degree of flexibility necessary in the usual telegraph practice. The repair of a damaged or broken terminal strip could only be made by replacing at least an entire row of terminals. The replacement would be further complicated and impeded by the presence of the relatively large number of wires which are terminated on such blocks.

The latter difficulty is also present in terminal blocks constructed according to the teachings of that portion of the prior art cited hereinbefore. There, individual terminals may be replaced, but only after dismantling a large part of, if not the entire, block. Because of a requirement for providing a large number of terminals disposed within restricted dimensions, the factor of safety in the strength of the terminals, while desirably large in the absence of other considerations, must be held to a reasonably safe minimum. Hence, because of the frequent applications of heat in soldering and unsoldering connections to the terminals and because of the attendant use of tools thereon, occasionally a terminal becomes damaged to the extent that replacement is necessary.

Accordingly, the present invention is concerned with a terminal block having a large number of terminals disposed within restricted dimensions and in which the aforementioned difficulties of the prior art are obviated, one of the objects being to provide a block in which the inter-terminal insulation resistance is maintained at a predetermined maximum value.

Another object of the invention is to produce a terminal block embodying terminal strips which may be quickly and easily replaced individually without any further dismantling of the block.

A further object of this invention is to provide a terminal employing a novel means for locking it in a supporting member.

A still further object is to produce a terminal block constructed to provide ready accessibility to the soldering lugs of all terminals.

The attainment of these and other more specific objects will become apparent from the following description taken in connection with the accompanying drawings of which:

Fig. 3 is an end elevation of the block of Figs. 1 and 2, partially cut away at the base to show one of the fanning openings therein;

Fig. 4 is a perspective view of one of the shorter terminal strips;

Fig. 5 shows, also in perspective, one form of locking member used in conjunction with the various terminal strips;

Fig. 6 illustrates the relative positions of a terminal strip, locking device and insulating member prior to assembly;

Fig. 7 shows the elements of Fig. 6 relative to one another after assembly;

Fig. 8 is a sectional view taken on the line 8—8 of Fig. 7 and further illustrating the assembly of the elements of Fig. 6 and the manner in which the locking member of Fig. 5 is prepared for removal;

Figure 12:
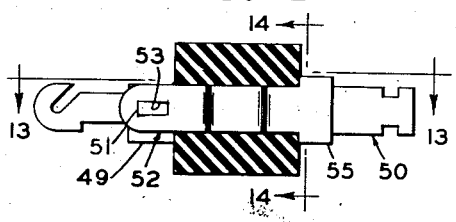
Fig. 12 illustrates the assembly of a further form of terminal strip and another form of locking device.
Figure 15:
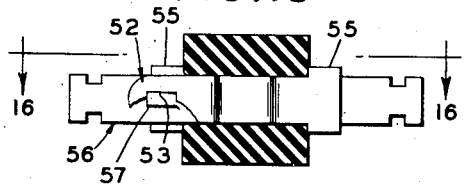
Figure 16:
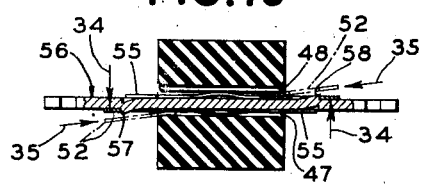

Figs. 15 and 16 afford two views of a still further form of terminal strip in assembly with two locking devices similar in form to those of Fig. 12.

Referring first to Fig. 4, there is shown a preferred form of a typical terminal strip 20 of good electrically conductive material embodying lugs 21 and 22 to which electric conductors may be soldered, or otherwise suitably affixed. The strip is generally flat with the exception of that portion of it comprising a projecting shoulder 23 which is disposed adjacent one end thereof and integral therewith, and which is faced inwardly toward the central portion of the strip. Adjacent the other end of the strip is another inwardly facing projecting shoulder 24 which is formed in one of the long edges of the terminal strip.

Fig. 5 illustrates a T-shaped locking member 25 of light resilient material, the function of which will be described subsequently. It will be noted that the central portion 26 is slightly bowed.

The installation of the terminal in a block may be followed by referring to Figs. 6, 7 and 8. An insulating supporting member 27 is provided with a slot 28 which is contiguous with the exterior of the support only at the entrance face 29 and at the exit face 30. The terminal 20 is first inserted in the slot 28, from the left as viewed in the drawings, until the shoulder 24 abuts the entrance face 29 of the support. In this position the shoulder 23 is disposed exterior of the support 27 adjacent the exit face 30 thereof. The locking member 25 is then counter inserted into the slot from the right. On this side of the support, the slot 28 is provided with beveled portions 31 so as to facilitate the insertion of the locking device. Complete insertion of the locking member 25 causes the head portion 33 thereof to nest into the bevel 31 and prevent further movement of the locking member to the left. When in this position, it is seen that the head 33 of the locking member is situated entirely between the exit face 30 of the support 27 and the shoulder 23 on the terminal strip 20. The width of the slot 28 is slightly less than the combined overall normal thicknesses of the body of the terminal 20 and the locking member 25 so that when the latter are inserted in the slot, the locking member is forced into close engagement with the terminal strip. This feature precludes the possibility of the head 33 of the locking member becoming disengaged from the shoulder 23.

As described hereinbefore, further movement of the terminal 20 to the right is prevented by the contact of the shoulder 24 with the entrance face 29 of the supporting member. Any tendency for the terminal being withdrawn from the support 27, or, in other words, being moved to the left, while the locking member 25 is in operative position is also prevented by the shoulder 23 coming in contact with the head 33 of the locking device and causing the latter to solidly engage the support 27. Thus the terminal 20 is securely positioned in the supporting member 27.

A terminal in accordance with the present invention may also be easily removed from the support 27, by first deflecting the head 33 of the locking member clear of the terminal shoulder as indicated in Fig. 8 by the arrow 34. The locking member 25 may then be withdrawn from the slot 28 as indicated by the arrow 35, following which the terminal 20 may be withdrawn from the left side of the support 27.

Figure 9:
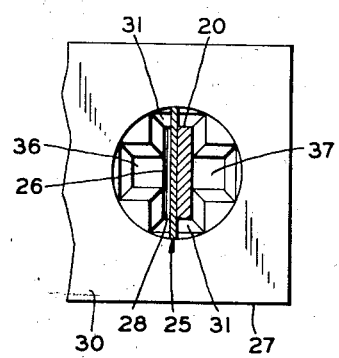
Fig. 9 is an enlarged view taken on the line 9—9 of Fig. 7 showing the terminal strip and locking device in assembled position and also the configuration of the slot in the supporting member.

In the preferred embodiment of the invention, a slot having the shape of a Greek cross is used, an enlarged illustration of which is shown in Fig. 9. In addition to being somewhat easier to form than slots having other shapes, the slot 28 shown here permits the assembly therein of the terminal 20 so that the ends thereof are disposed either vertically as shown, or horizontally as they would be if the body of the terminal were inserted in that part of the slot formed by the recessed portions 36 and 37 in the sides thereof. At least one of the recessed portions 36 or 37 is necessary for a terminal 20 of this preferred form to provide for the passage of the shoulder 23 through the support 27. Hence, with the added recess, a terminal may be installed in any desired position.

Figure 1:
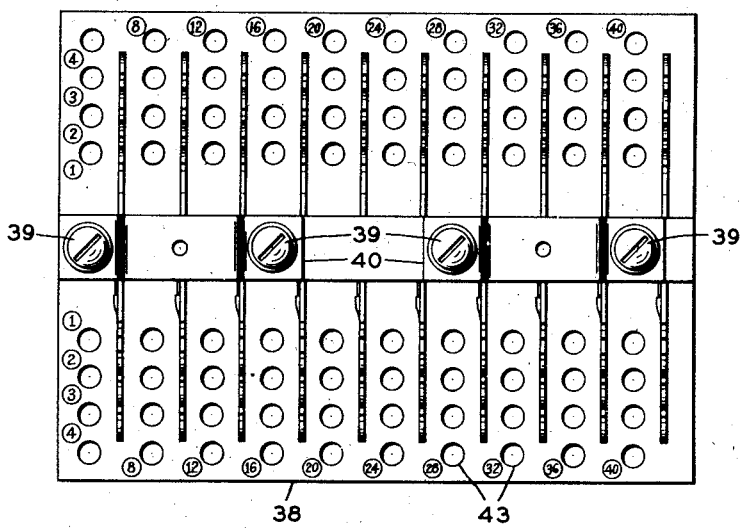
Fig. 1 is a plan view of a terminal block embodying terminal strips constructed in accordance with the present invention.
Figure 2:
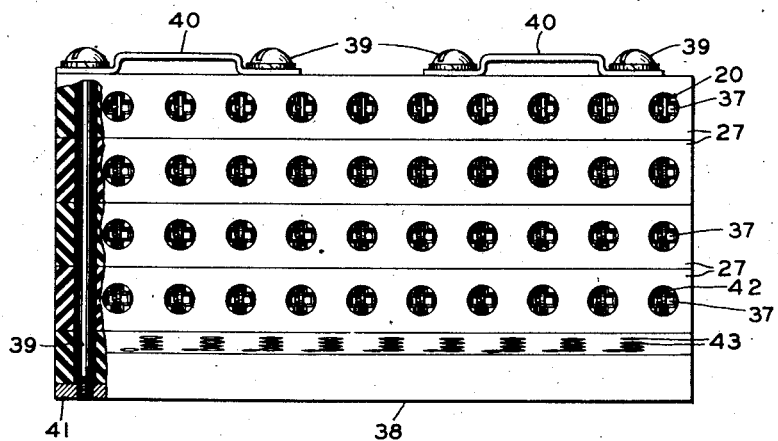
Fig. 2 is a side elevation of the block of Fig. 1, partly in section, to illustrate some of the construction details.

A multi-terminal distributing block constructed in accordance with this invention is shown in Figs. 1, 2 and 3. It is comprised of four elongated supporting members 27 each having a plurality of transverse slots therein of the form shown in Fig. 9. The supporting members 27 are assembled on an insulating base 38 in a superimposed manner one upon the other and fastened by four screws 39 which also serve to secure to the top supporting member two brackets 40 by which a cover may be attached. The screws 39 are secured to the base 38 by being threaded into a metallic insert 41 disposed on the underside of the base in a suitable recess thereof. Each of the supporting members 27 is provided with terminals of the form described but varying in length, the longest 42 comprising the row adjacent the base 38 and grading therefrom to the shortest 20 which comprise the row most remote from the base. Corresponding terminals of different tiers are in alignment, but the graduated lengths thereof provide the necessary degree of accessibility. The base 38 is provided with individual fanning openings 43 for each end of each of the terminal strips.

Figure 10:
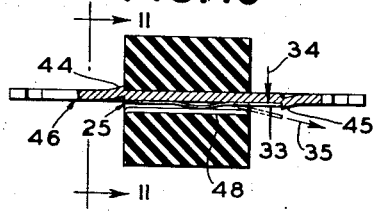
Fig. 10 illustrates a terminal assembly employing another form of terminal strip.
Figure 11:
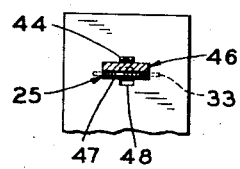
Fig. 11 is a view taken on the line 11—11 showing the terminal strip in its relation to the face of the supporting member, and also another configuration of the slot therein.

Another form of terminal embodying the present invention is illustrated in Figs. 10 and 11.

In this form, both of the shoulders 44 and 45 are formed in the faces of the strip 46 adjacent the ends thereof. A slightly differently shaped slot 47 is required in the supporting member. In this case only one recessed portion 48 may be used and that to allow the passage of the shoulder 45 through the support, thus forming a generally T-shaped slot. The same form of locking member 25 as illustrated in Fig. 5 is used to securely position the terminal 46 in the support and is removed as indicated by the arrows 34 and 35.

Figure 13:
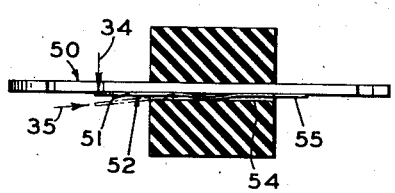
Fig. 13 is a view taken on the line 13—13 of Fig. 12 further illustrating the elements of Fig. 12 and also the manner in which the locking member is prepared for removal.
Figure 14:
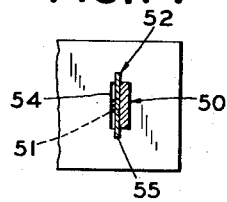
Fig. 14 is a view taken on the line 14—14 of Fig. 12 and shows a further configuration of the slot in the supporting member.

Still another form of terminal constructed according to this invention is shown in Figs. 12, 13 and 14. An inwardly facing shoulder 49 is formed in one edge of the terminal strip 50 adjacent one end thereof and is similar to the corresponding shoulder of the terminal illustrated in Fig. 4. The present form of terminal embodies an outwardly facing shoulder 51 which projects from one face thereof adjacent the end embodying the shoulder 49. The locking member 52, while generally similar to that shown in Fig. 5, has the added feature of an aperture 53 disposed in the tail portion thereof, the function of which is to engage the shoulder 51 of the terminal 50 when the two are counter inserted into the slot 54. The head portion 55 of the locking member 52 abuts the exit face of the support in a manner such that the assembled elements are effectively locked in position in said support. The manner of removal of the locking member 52 is indicated by arrows 34 and 35. While this form of terminal requires only a rectangularly shaped slot 54 in the supporting member, it may also be employed with the slots of Figs. 9 and 11 with equal facility.

In Figs. 15 and 16 is shown an added form of terminal 56 in which two outwardly facing shoulders 57 and 58 are formed in opposite faces of the terminal adjacent the ends thereof. Two locking members 52 having apertures 53 in the tail portions thereof similar to that shown in Figs. 12, 13 and 14, are required with the present form of terminal. With the terminal inserted into a T-shaped slot 47, which is similar to that of Fig. 11, the locking members 52 are inserted from opposite sides of the support and on opposite faces of the terminal 56 until their head portions 55 abut the faces of the support and the apertures 53 engage the shoulders 57 and 58, in which positions the assembly is effectively locked in the supporting member as may be seen. The locking members are withdrawn as indicated by the arrows 34 and 35. A slot 47 of the shape illustrated is necessary to permit the passage of one of the shoulders 57 or 58, but a slot shaped similar to that shown in Fig. 9 may also be used with the present form of terminal.

From the foregoing description it should be apparent that a terminal block constructed in accordance with the present invention provides facilities for terminating and cross connecting a large number of conductors, and which is contained in a space of restricted dimensions. Also a terminal block of such construction is quite flexible in its composition and embodies terminals which may be readily replaced, which are adequately accessible and between which there is provided an insulation, the electrical resistance of which is less liable to change due to an accumulation of foreign matter thereon than that of other conventional designs.

The invention has been disclosed in a number of different forms, but it is recognized that there are others which lie within the scope of the present invention and which will be suggested to one skilled in the art. Hence, it is desired that the invention be limited only by the prior art or as indicated in the appended claims.

What is claimed is:

1. In a terminal block comprising an insulating support having a transverse slot therein, the combination of a terminal for electric conductors comprising a strip of electrically conductive material for insertion into said slot, said strip embodying two shoulder portions integral therewith, one of said shoulders abutting the entrance face of said support, and locking means for counter insertion into said slot and into registry with the exit face of said support and the other of said shoulders to releasably lock said strip in said support.

2. In a terminal block comprising an insulating support having a T-shaped transverse slot therein, the combination of a terminal for electric conductors comprising a strip of electrically conductive material for insertion into said slot, said strip terminating in soldering lugs and embodying two inwardly facing shoulder portions adjacent the ends thereof and integral therewith, at least one of said shoulders disposed on a face of said strip and positioned external of said support adjacent the exit face thereof, the other of said shoulders abutting the entrance face of said support, and a T-shaped locking member of light resilient material for counter insertion into said slot with the head of said locking member in registry with said exit face and said first mentioned shoulder to releasably lock said strip in said support.

3. In a terminal block comprising an insulating support having a T-shaped transverse slot therein, the combination of a terminal for electric conductors comprising a strip of electrically conductive material for insertion into said slot, said strip terminating in soldering lugs and embodying two inwardly facing shoulder portions adjacent the ends thereof and integral therewith, one of said shoulders projecting edgewise of said strip and abutting the entrance face of said support, the other of said shoulders projecting from a face of said strip and positioned external of said support adjacent the exit face thereof, and a T-shaped locking member of light resilient material for counter insertion into said slot with the head end of said locking member in registry with said exit face and said last mentioned shoulder to releasably lock said strip in said support.

4. In a terminal block comprising an insulating support having two transverse slots therein, said slots being disposed at right angles to be longitudinally mutually bisecting, the combination of a terminal for electric conductors comprising a strip of electrically conductive material for insertion into either of said slots, said strip terminating in soldering lugs and embodying two inwardly facing shoulder portions adjacent the ends thereof and integral therewith, one of said shoulders projecting edgewise of said strip and abutting the entrance face of said support, the other of said shoulders projecting from a face of said strip and positioned external of said support adjacent the exit face thereof, and a T-shaped locking member to light resilient material for counter insertion into said slot with the head end of said locking member in registry with said exit face and said last mentioned shoulder to releasably lock said strip in said support.

5. In a terminal block comprising an insulating support having a T-shaped transverse slot therein, the combination of a terminal for electric conductors comprising a strip of electrically conductive material for insertion into said slot, said strip terminating in soldering lugs and embodying two inwardly facing shoulder portions projecting from opposite faces adjacent the ends thereof and integral therewith, one of said shoulders abutting the entrance face of said support, the other of said shoulders being positioned external of said support adjacent the exit face thereof and a T-shaped locking member of light resilient material for counter insertion into said slot with the head end of said locking member in registry with said exit face and said last mentioned shoulder to releasably lock said strip in said support.

6. In a terminal block comprising an insulating support having a rectangular transverse slot therein, the combination of a terminal for electric conductors comprising a strip of electrically conductive material for insertion into said slot, said strip terminating in soldering lugs and embodying two oppositely facing shoulder portions adjacent one end thereof and integral therewith, one of said shoulders projecting edgewise of said strip and abutting the entrance face of said support, the other of said shoulders projecting from a face of said strip and positioned external of said support adjacent the entrance face thereof, and a T-shaped locking member of light resilient material having a rectangular aperture in the tail end thereof, said member for counter insertion into said slot with the head end of said locking member in registry with the exit face of said support and said aperture in registry with said last mentioned shoulder to releasably lock said strip in said support.

7. A terminal block comprising an insulating support having a plurality of parallel transverse slots therein, a terminal strip for electric conductors contained in each of said slots, said strips comprising a body portion having a plurality of retaining means integral therewith, and a T-shaped locking member contained in each of said slots engaging said support and one of said retaining means to releasably lock each of said strips independently in said support.

8. The invention as defined in claim 7 further characterized by an insulating support having a plurality of rows of parallel transverse slots therein and by terminal strips having different lengths, the bottom one of said rows containing the longest one of said strips, the top one of said rows containing the shortest of said strips and the intervening rows containing said strips in lengths graduated between said top and bottom rows.

9. The invention as defined in claim 7 further characterized by a plurality of insulating supports each having a row of parallel slots therein and means for mounting said insulating supports superimposed upon one another to provide successive rows of said terminal strips each of said rows having a different length of strip.

10. The invention as defined in claim 7 further characterized by a plurality of insulating supports each having a row of parallel slots therein, an insulating base and means for mounting said insulating supports on said base superimposed upon one another to provide successive rows of said strips, said strips having lengths inversely proportional to their respective distances from said base and said base having fanning openings therein individual to each end of each of said terminal strips.

FRANK LESLIE CURRIE.
LEWIS H. ROVERE.